United States Patent [19]

Roman

[11] Patent Number: 5,615,837
[45] Date of Patent: Apr. 1, 1997

[54] DELIVERY NOZZLE FOR FLEXIBLE-HOSE IRRIGATION SYSTEMS

[75] Inventor: Gianfranco Roman, Pasiano, Italy

[73] Assignee: Claber S.p.A., Fiume Veneto, Italy

[21] Appl. No.: 403,285

[22] Filed: Mar. 13, 1995

[30] Foreign Application Priority Data

Mar. 22, 1994 [IT] Italy ................. MI94U-0210

[51] Int. Cl.⁶ .................................................... B05B 1/30
[52] U.S. Cl. ........................ 239/530; 239/581.1; 239/588; 251/309
[58] Field of Search ........................... 251/304, 309, 251/312; 239/581.1, 530, 525, 588

[56] References Cited

U.S. PATENT DOCUMENTS

| | | | |
|---|---|---|---|
| 3,783,890 | 1/1974 | Wurzburger | 251/309 X |
| 4,915,304 | 4/1990 | Campani | 239/581.1 X |
| 5,234,193 | 8/1993 | Neal | 251/309 X |
| 5,480,124 | 1/1996 | Bartlett et al. | 239/309 |

FOREIGN PATENT DOCUMENTS

A2112252  10/1972  Germany .
3403891   8/1985   Germany ................. 251/309
11750     of 1901  United Kingdom ....... 239/393

*Primary Examiner*—Kevin Weldon
*Attorney, Agent, or Firm*—Nixon & Vanderhye, P.C.

[57] ABSTRACT

The nozzle comprises a grip casing with an approximately rectilinear shape inside which, in a longitudinal direction, there is a rigid pipe for water passage formed by an upstream section and a downstream section separated by an internal cavity of the nozzle casing and a push-button movably inserted in said cavity to allow and, alternatively, to cut off the flow of water along the abovementioned pipe. The push-button is substantially in the shape of a half-disc with an internal passage extending from one side to the other of the same and is rotatably inserted in the cavity so that it can be rotated round an axis perpendicular to the direction of the passage of the water between an open position and a closed position. On each side of the push-button there is a seal substantially in the shape of an 8, one half of which frames a corresponding end of the internal passage of the push-button and, when the push-button is in the open position, the facing pipe section and whose other half frames an adjacent portion of the side of the push-button suitable for arranging itself in front of the same pipe section when the push-button is in the closed position.

7 Claims, 2 Drawing Sheets

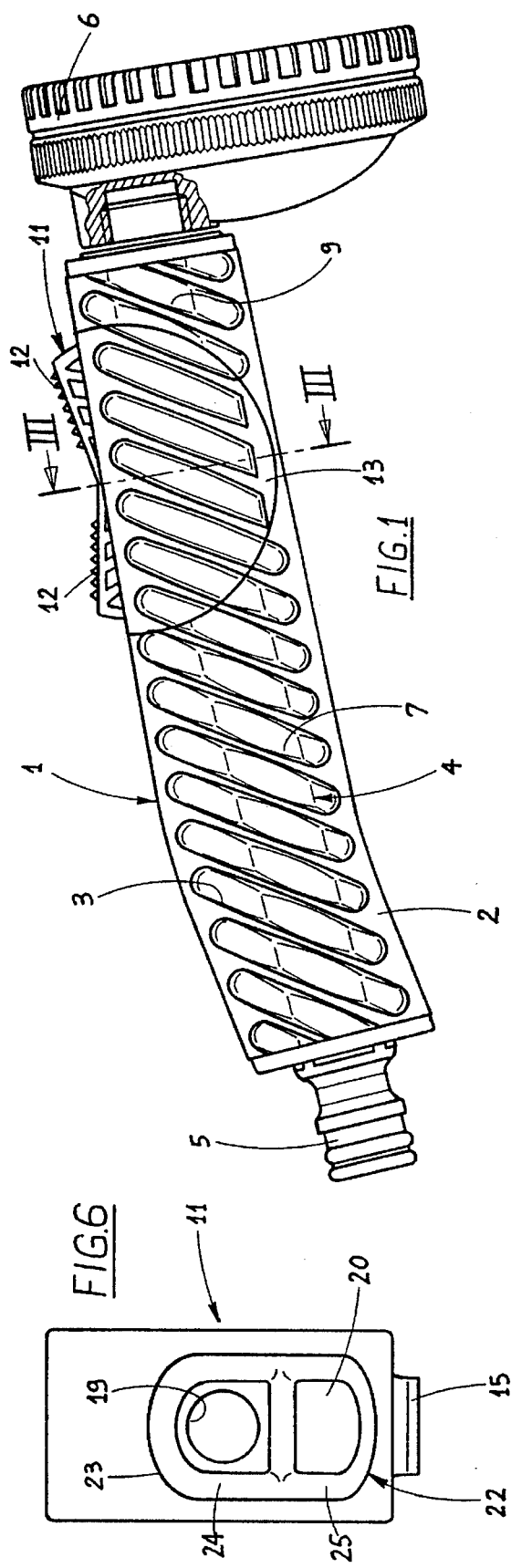
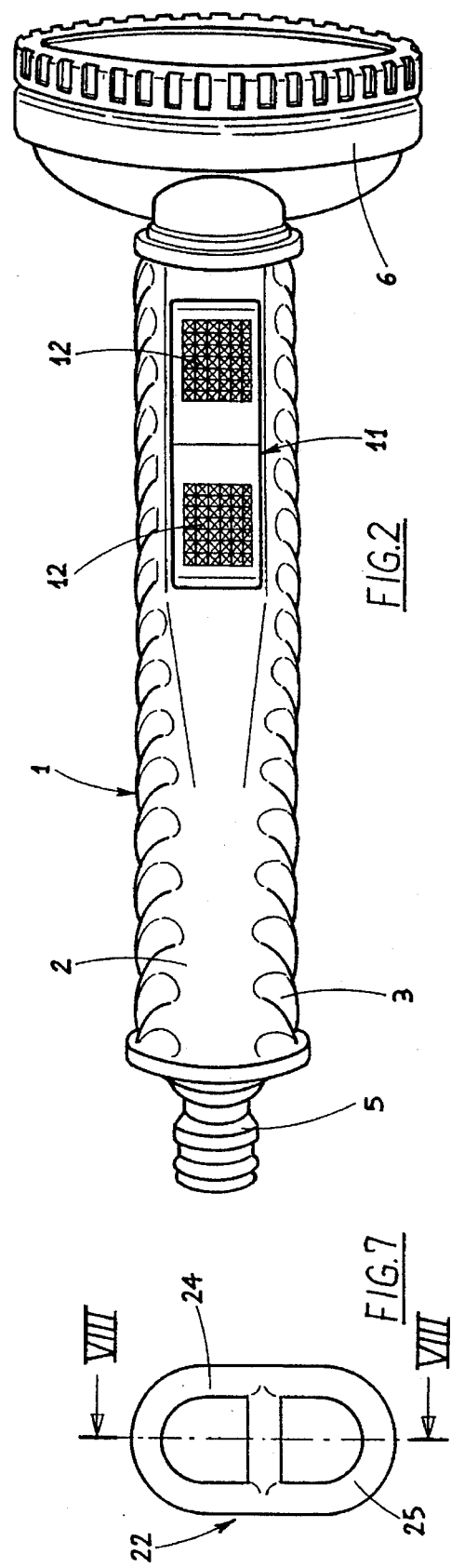

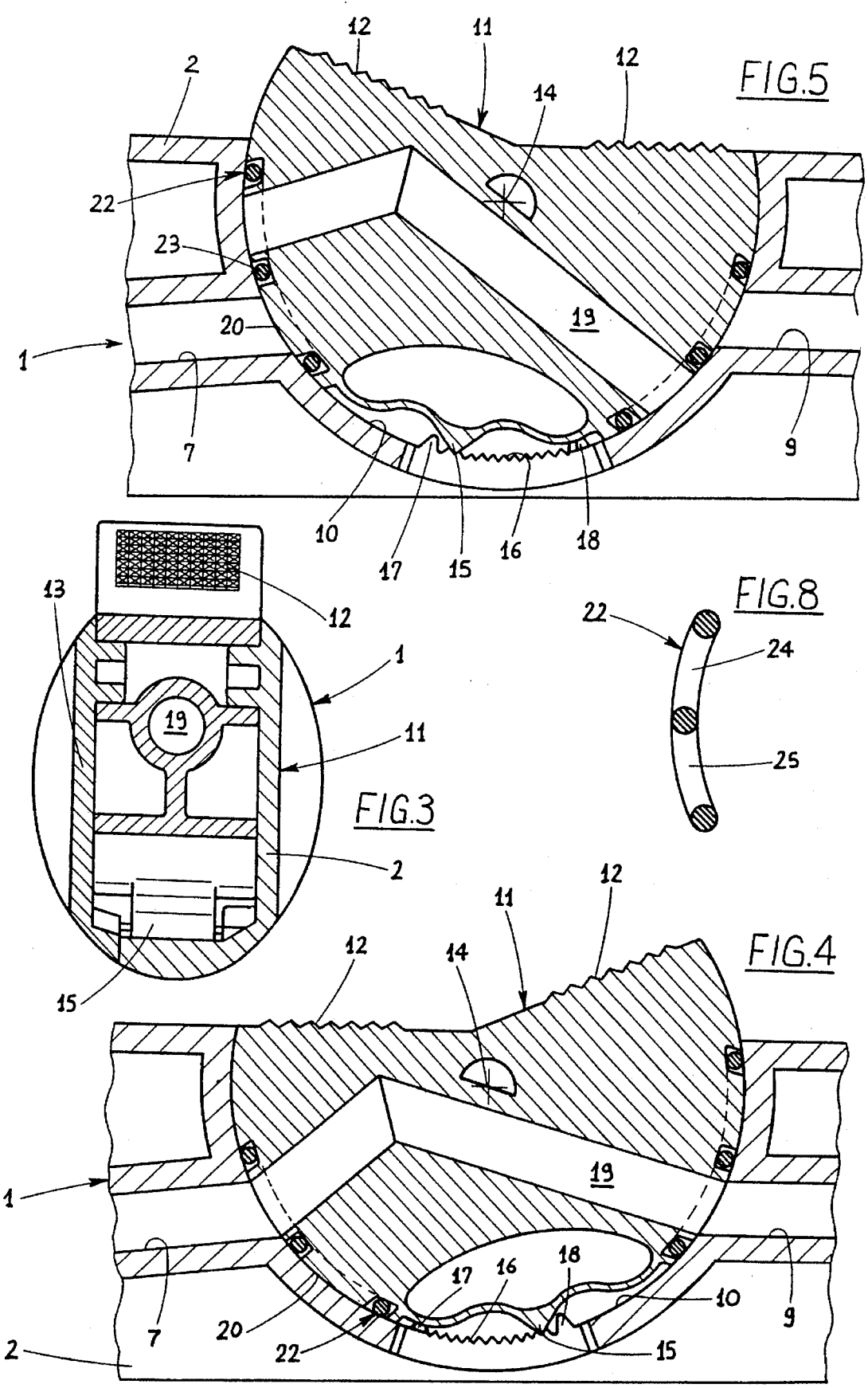

DELIVERY NOZZLE FOR FLEXIBLE-HOSE IRRIGATION SYSTEMS

BACKGROUND

I. Field of the Invention

The present invention relates to a delivery nozzle for flexibLe-hose irrigation systems.

II. Related Art and Other Considerations

Various types of delivery nozzles can be applied to the outlet of a flexible irrigation hose to allow the user to direct the flow of water where it is more appropriate.

The simpler nozzles, and those of older design, only provide for the control of the shape of the jet, accomplished by rotation of a terminal diffusor, without the possibility of cutting off the same.

Other nozzles have the shape of a pistol and are provided with a trigger to allow the delivery of water to be varied down to the complete cutting off of the jet. The variation of the shape of the jet is in this case entrusted to a diffusor Located at the outlet of the pistol.

Finally, there is a type of an essentially straight nozzle with terminal diffusor, that entrusts the cutting off of the jet to a push-button that can be moved inside a cavity of the casing of the nozzle, transversally to the direction of the flow of the water, between an open position and a closed position wherein the jet is cut off.

In this Latter type of nozzle there is the problem of the Lateral water seal along the path of the water. The seal is satisfactory with the push-button closed, when a suitable plug held by the push-button engages with a fixed seal to cut off the flow of water completely. But the seal is less satisfactory with the push-button open, when the abovementioned engagement is missing.

In view of this state of the art, an object of the present invention is to provide a delivery nozzle of an essentially rectilinear type with a push-button for cutting off the flow, that offers maximum guarantees of lateral water seal both with the push-button closed and with the push-button open.

SUMMARY

According to the invention such object is attained by a nozzle comprising a casing with an approximately rectilinear shape inside which, in a Longitudinal direction, there is a rigid pipe for water passage formed by an upstream section and a downstream section separated by an internal cavity of the nozzle casing and a push-button movably inserted in said cavity to allow and, alternatively, to cut off the flow of water along the abovementioned pipe, characterized in that said push-button is substantially in the shape of a half-disc with an internal passage extending from one side to the other of the same and is rotatably inserted in said cavity so that it can be rotated round an axis perpendicular to the direction of said pipe for the passage of the water between an open position wherein said internal passage of the push-button is aligned with said upstream and downstream pipe sections to allow the flow of water from one of these to the other and a closed position wherein the sides of the push-button close said pipe sections to cut off the passage of the water, there being provided on each side of the push-button a seal substantially in the shape of an 8, one half of which frames a corresponding end of the internal passage of the push-button and, when the push-button is in the open position, the facing pipe section and whose other half frames an adjacent portion of the side of the push-button suitable for arranging itself in front of said pipe section when the push-button is in the closed position.

Thanks to the use of the abovementioned push-button with an 8-shaped seal there is thus obtained a safe and perfect water seal both at the inlet and at the outlet of the push-button.

BRIEF DESCRIPTION OF THE DRAWINGS

The features of the present invention will be made more evident by the following detailed description of an embodiment thereof illustrated as a non-limiting example in the enclosed drawings, wherein:

FIG. 1 shows a side view of a nozzle according to the invention;

FIG. 2 shows the abovementioned nozzle in a plan view from above;

FIG. 3 shows the same nozzle in a cross-section taken along line III—III of FIG. 1;

FIG. 4 shows, in a longitudinal cross-section, the enlarged detail, in the open position, of the push-button for operating the nozzle of FIGS. 1–3;

FIG. 5 shows, in a longitudinal section, the enlarged detail, in the closed position, of the push-button for operating the nozzle of FIGS. 1–3;

FIG. 6 shows one side of the abovementioned operating push-button;

FIG. 7 shows the detail of a seal associated with the abovementioned side;

FIG. 8 shows said seal as sectioned taken along line VIII—VIII of FIG. 7.

DETAILED DESCRIPTION OF THE DRAWINGS

The nozzle shown in the drawings comprises a grip 1 formed by a casing 2 of plastic material 2 provided with weight-saving windows 3. Inside guys extends a rigid pipe 4 through which the water flows from a fitting 5 (for a flexible delivery hose) to a variously-shaped diffusor 6 (screwed onto a threaded end of the casing 2).

The internal pipe 4 is divided into an upstream section 7 connected to the fitting 5 and a downstream section 9 connected to the diffusor 6.

Between the two sections 7 and 9 of the pipe there is interposed a semicircular cavity 10. Cavity 10 is closed laterally by a cover 13 and rotatably accommodates a cut-off actuator or push-button 11. Push-button 11 is substantially in the shape of a half-disc with operating planes 12 accessible from the outside of the grip. That is, push-button or actuator 11 has a semi-circular cross-sectional shape in a plane lying in the longitudinal direction of casing 2. Push-button 11 rotates about an axis 14 perpendicular to the rigid pipe 4. A cross-bow shaped protrusion 15 engages with fixed notches 16 on the bottom of the cavity 10 to facilitate the rotation of the push-button 11. Rotation of push-button 11 takes place in successive steps between two end positions determined by the engagement of the protrusion 15 with end abutments 17 and 18 (FIGS. 4 and 5).

In the position of FIG. 4 an internal passage at an angle 19 extending from one side to the other of the push-button links the two sections 7 and 9 of the pipe, allowing the free flow of water toward the diffusor 6. This position is thus defined as the open position of the push-button.

In the position of FIG. 5 the internal passage 19 is, on the other hand, displaced at an angle with respect to the two sections 7 and 9 of the pipe, that are consequently closed by respective lateral portions 20 of the push-button 11. The flow of water is thus cut off by the push-button 11, whose position is thus defined as closed.

With each side of the push-button 11 there is associated a seat 22 substantially in the shape of an "8" (FIGS. 7 and 8). Seal 22 is inserted in a groove 23 with a similar shape obtained in the side of the push-button (FIGS. 4-6).

As shown in FIGS. 4 and 5, seal members 22 at provided at an interface between casing 2 and the actuator (i.e., push-button 11). As shown in FIGS. 7 and 8, each seal 22 is of one piece construction and has two orifices therein. A first of the orifices is circumferentially provided about the actuator fluid passage 19, the second of the orifices is provided about an appropriate one of the upstream fluid passage 7 and the downstream fluid passage 9 when the actuator fluid passage 19 is not in fluidic communication with the appropriate one of the upstream fluid passage 7 and the downstream fluid passage 19.

One half 24 of the seal 22 frames a corresponding end of the internal passage 19 of the push-button 11 and, when the push-button is in the open position of FIG. 4. It also frames the facing section 7 or 9 so as to ensure a perfect lateral water seal along the flow of water.

The other half 25 of the seal 22, on the other hand, frames an adjacent portion of side 20 of the push-button 11 that, with the push-button in the closed position of FIG. 5, is located in front of the abovementioned section 7 or 9 of the pipe.

In both positions the lateral water seal upstream and downstream from the push-button 11 is thus ensured.

It should be considered that the threaded engagement of the diffusor 6 on the casing 2 allows not only the replacement of the diffusor with another possibly more suitable for the specific use required, but also the interposition of an extension with suitable fittings to allow the nozzle to reach places that are far away and otherwise inaccessible.

I claim:

1. A nozzle having a casing which extends generally rectilinearly in a longitudinal direction, the casing having an upstream section and a downstream section, the upstream section being attachable to a flexible hose, the upstream section having an upstream fluid passage formed therein and the downstream section having a downstream fluid passage formed therein, the nozzle including an actuator which selectively fluidically connects the upstream fluid passage and the downstream fluid passage by selective orientation of an actuator fluid passage formed in the actuator, the nozzle having a seal member at an interface between the casing and the actuator, the seal member being of one piece construction and having two orifices therein, a first of the orifices being circumferentially provided about one of the upstream fluid passage and the downstream fluid passage when the actuator fluid passage does not fluidicly connect the upstream fluid passage and the downstream fluid passage.

2. A nozzle according to claim 1, wherein the actuator is rotatable about an actuator axis, the actuator axis being perpendicular to the longitudinal direction, wherein the actuator has a semi-circular cross-sectional shape in a plane lying in the longitudinal direction, a portion of a semi-circular periphery of the actuator having the shape of a cross-bow, the cross-bow being provided with a protrusion, the protrusion selectively engaging notches formed on an internal semi-circular cavity provided in the casing.

3. The nozzle according to claim 1, wherein the actuator has a recessed groove which accommodates the seal member.

4. The nozzle according to claim 1, wherein the seal member substantially has an "8" shape.

5. A nozzle according to claim 2, wherein the actuator rotates in successive steps between two extreme positions determined by the engagement of said protrusion on the cross-bow shaped periphery with fixed end abutments formed on the internal semi-circular cavity.

6. A nozzle having a casing which extends generally rectilinearly in a longitudinal direction, the casing having an upstream section and a downstream section, the upstream section being attachable to a flexible hose, the upstream section having an upstream fluid passage formed therein and the downstream section having a downstream fluid passage formed therein, the nozzle including an actuator which selectively fluidically connects the upstream fluid passage and the downstream fluid passage by selective orientation of an actuator fluid passage formed in the actuator, the actuator being rotatable about an actuator axis, the actuator axis being perpendicular to the longitudinal direction, wherein the actuator has a semi-circular cross-sectional shape in a plane lying in the longitudinal direction, a portion of a semi-circular periphery of the actuator having the shape of a cross-bow, the cross-bow being provided with a protrusion, the protrusion selectively engaging notches formed on an internal semi-circular cavity provided in the casing.

7. A nozzle according to claim 6, wherein the actuator rotates in successive steps between two extreme positions determined by the engagement of said protrusion on the cross-bow shaped periphery with fixed end abutments formed on the internal semi-circular cavity.

* * * * *